Sept. 30, 1958  W. V. THELANDER  2,853,862
FRICTION CLUTCH PLATE
Filed Sept. 1, 1955
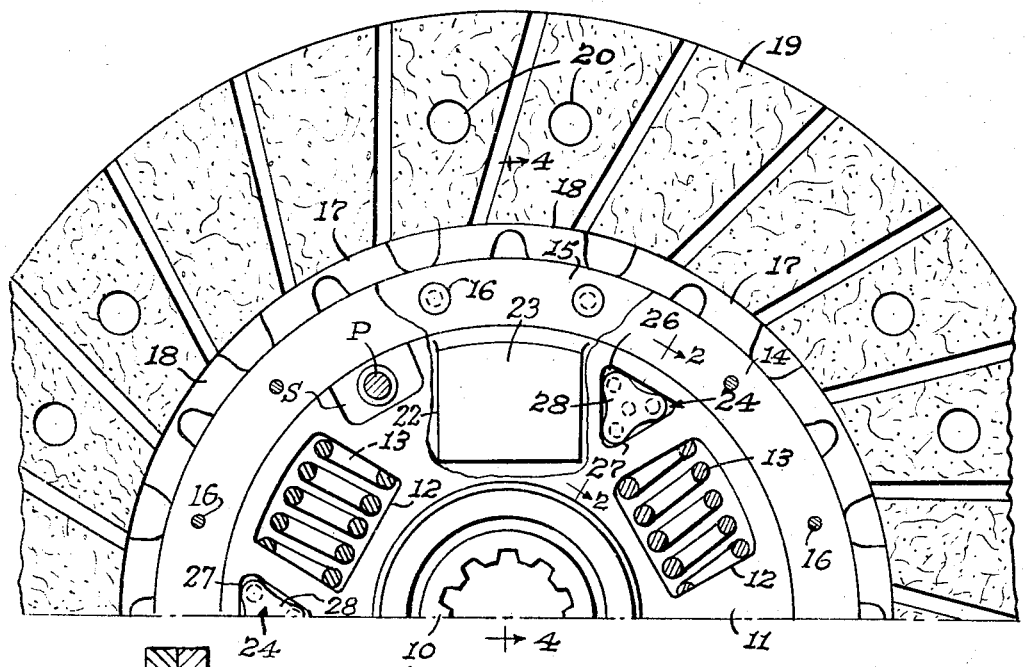
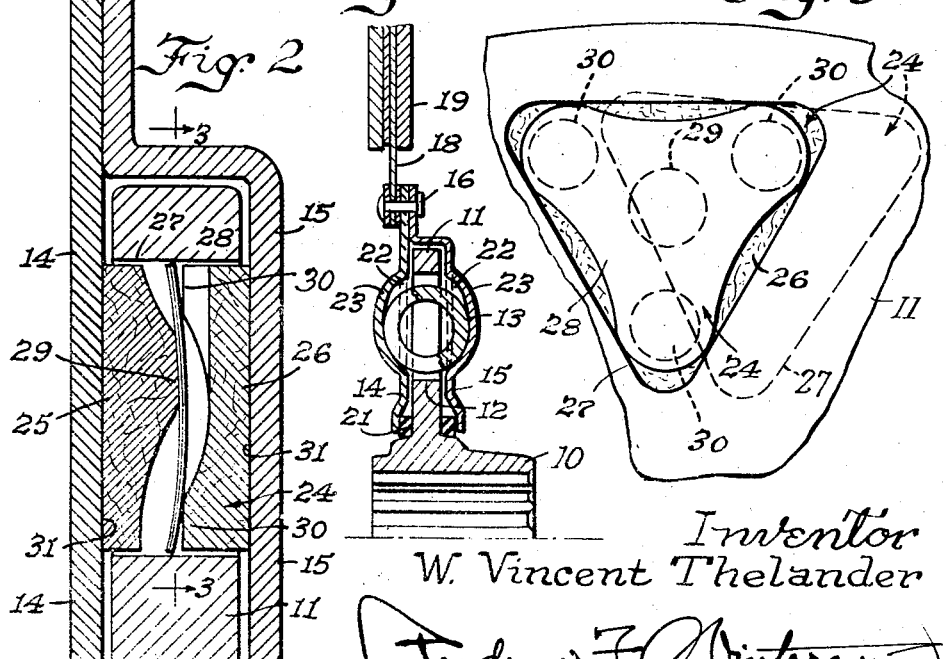
Inventor
W. Vincent Thelander United States Patent Office 2,853,862
Patented Sept. 30, 1958

2,853,862

FRICTION CLUTCH PLATE

W. Vincent Thelander, Toledo, Ohio, assignor to Dana Corporation, Toledo, Ohio, a corporation of Virginia Application September 1, 1955, Serial No. 532,093

10 Claims. (Cl. 64—27)

This invention relates to motion transmitting elements, and is more particularly concerned with improvements in automotive type friction clutch plates, although the present improvements are substantially equally applicable to what are known commercially as vibration dampeners, the present improvements being concerned with shock absorption and vibration dampening.

The principal object is to provide a motion transmitting element, such as a clutch plate, having spring means between the relatively oscillatory inner and outer elements, and incorporating friction brake or drag means in the spaces between springs to check the recoil action of the springs so as to smoothen the drive. In some previous constructions, the braking action occurred between the hub element and the cover plates, but, as pointed out hereinafter, that arrangement not only located the drag too close to the axis of rotation for a good mechanical advantage, but the location was bad from the standpoint that dirt and grit working its way between these relatively moving parts changed the frictional resistance to movement to such an extent that no two plates could be predicted to work alike. By locating the friction brake means between springs, as far from the axis of rotation as the hub construction permits, namely, at a maximum radius from the axis of rotation, I obtain the best mechanical advantage and at the same time avoid the other serious objection mentioned. The present construction is, in this respect, among others, an improvement on the construction disclosed in my Patent No. 2,674,863.

In prior constructions manually adjustable friction brake means were provided, as shown, for example, in Wemp Patent No. 1,750,828, but they were not satisfactory for the following reasons:

(1) The original adjustment made at the factory, at the time of assembly of the plate, lasted only a short time because the springs used in connection with the braking means for spring loading invariably had such a high rate of change that only a little wear was enough to throw the brake means almost completely out of commission, and (2) A new adjustment could not be made with any degree of accuracy without removal of the plate from the clutch for testing in a brake test rig, which, of course, would not be practical in most cases because of the great expense that that would entail.

It is, therefore, another important object of my invention to avoid those objections by providing the spring means relied upon for the brake effect of a form having such a low rate of change that the small amount of wear that will occur has no appreciable effect upon the braking action, the spring means employed being, furthermore, of a type which needs no manual adjustment, so that the structure is virtually self-adjusting or self-compensating for wear, and it is practical to incorporate the same inside the clutch plate assembly, it being no longer necessary that it be accessible.

In accordance with my invention three fraction lag units are provided in equally circumferentially spaced relation in the hub assembly, each consisting of a pair of spring-pressed brake shows slidable in a transverse bore provided in the annular flange of the hub member, said shoes being relatively conformed on their opposing inner end faces to provide projections so arranged with respect to one another to dish a leaf spring or leaf spring pack that is assembled in the bore between the projections on said shoes, the latter having their flat outer end faces frictionally engaging the inner sides of the plates engaging the inner sides of the plates that are disposed on opposite sides of the flange and provide spring receiving pockets with abutments for the ends of the springs disposed in the usual way in circumferentially spaced slots in the flange, the spring pressure of the leaf springs on the brake shoes insuring the desired braking action throughout the life of the clutch plate without need for any adjustment. The brake shoes may be molded economically to final form from sintered material, composition material, or brake lining material.

The invention is illustrated in the accompanying drawing, in which—

Figs. 1 is a rear view of a half portion of a clutch plate made in accordance with my invention showing most of the one hub housing plate broken away so as to better illustrate the hub construction and also showing the triangular shaped leaf springs of one of the friction lag units in elevation on the line 3—3 of Fig. 2, a portion of still another leaf spring of another friction lag unit being also indicated, as well as the stop for positively limiting relative movement and accordingly limiting compression of the cushioning springs;

Fig. 2 is a section on the line 2—2 of Fig. 1 on a larger scale;

Fig. 3 is a detail on the line 3—3 of Fig. 2, and

Fig. 4 is a section on the line 4—4 of Fig. 1.

The same reference numerals are applied to corresponding parts throughout the views.

Referring to the drawing, the clutch plate shown comprises relatively rotatable inner and outer portions, the inner portion being formed by a center hub 10, splined for driving connection with the driving shaft of an automotive transmission and provided with an annular flange 11 in which there are circumferentially spaced slots 12, one for each of a plurality of spring cushioning means 13. Two circular plates 14 and 15 are disposed on opposite sides of the flange 11 and are suitably secured together by rivets 16. These rivets also serve to fasten two series of like stamped sheet metal segments 17 and 18 in two parallel planes to the outer peripheral portion of plate 14 to complete the assembly of the outer element of the clutch plate. Annular friction facing rings 19 are riveted, as indicated at 20, one to alternate segments 18 that are in one plane, the other to the intermediate segments 17 that are in the other plane. It is unnecessary to go here into the further details of this portion of the plate's construction inasmuch as the "mush" details are not involved. Gasket rings 21 of neoprene rubber or other compressible resilient material are provided encircling the hub 10 on opposite sides of flange 11 to seal the plate against ingress of dirt and grit between the relatively oscillatory inner and outer portions of the plate.

In operation, when relative movement occurs between the inner and outer portions of the clutch plate the springs 13 are compressed to cushion the drive. A stop pin P secured to plates 14 and 15 and extending through slot S in the flange 11 serves to limit relative movement and accordingly limits compression of the springs 13. In the relative movement between the flange 11 and plates 14 and 15 the springs 13 are compressed between one end of the slots 12 and shoulders 22 at the other end of the pockets 23, the springs being compressed to whatever extent is required to overcome the resistance to turning of the propeller shaft drivingly connected with the shaft driven by hub 10. The springs 13 are preloaded to a predetermined extent when inserted in slots 12 in order that they will offer the right drive and cushioning action. After the resistance to turning of the propeller shaft has been overcome and the springs 13 tend to recoil, the return of the parts to their initial relationship is, in accordance with the present invention, frictionally resisted by a plurality of friction lag units indicated generally by the reference numeral 24. The present plate has six cushioning springs 13 in equally circumferentially spaced relation and three friction lag units in equally circumferentially spaced relation between the springs, all of said units being at a maximum radius from the axis of rotation, as clearly appears in Fig. 1, with a view to obtaining the best mechanical advantage and at the same time avoiding the objection that dirt and grit working its way between the relatively moving parts of the plate would interfere with obtaining the desired amount of frictional resistance to movement, as previously mentioned. Each friction lag unit consists of two brake shoes 25 and 26 of triangular cross-section with the apex of the triangle radially innermost and the base portion of the triangle radially outermost, as clearly appears in Figs. 1 and 3, the pair of shoes being slidably but nonrotatably received in a triangular-shaped bore 27 extending transversely through the flange 11, and there being either a single triangular-shaped leaf spring or, as herein shown, a stack of two (or more) such springs 28 disposed between the shoes and bowed by the compressive action of the substantially central circular projection 29 on the one shoe 25 bearing against the central portion of the springs 28 on one side, and the engagement of three substantially circular corner projections 30 at the three corners of the other shoe 26 on the three corner portions of the springs 28 on the opposite side, the shoes 25 and 26 being forced together to bow the springs 28 in the manner indicated in Fig. 2 when the plates 14 and 15 are riveted together at 16 and have the plate segments 17 and 18 riveted thereto at the same time, as previously described. The shoes 25 and 26 may be molded of any suitable friction facing material such as brake lining material, composition material, or sintered material, namely, compressed powdered metal. The flat outer end faces 31 on the shoes 25 and 26 frictionally engaging the inner sides of the plates 14 and 15 under the spring pressure of springs 28 provide the desired friction drag or braking action. The frictional resistance or drag thus exerted does not vary to any appreciable extent with what little wear occurs due to the small amount of relative movement between the parts in the operation of the clutch. The dotted line showing of the friction brake shoe in Fig. 3, indicates the small extent of relative movement. Furthermore, the springs 28 have such a low rate of change that the small amount of wear that will occur has no appreciable effect upon the braking action. The equilateral triangular form of the springs 28, taken together with the even spacing of the three projections 30 that engage these springs from one side and the central location of the projection 29 engaging the springs on the other side, insures substantially uniform spring pressure on the end faces 31 and also substantially uniform wear, and a smooth quiet drive is obtained.

It is believed the foregoing description conveys a good understanding of the objects and advantages of my invention. The appended claims have been drawn to cover all legitimate modifications and adaptations.

I claim:

1. In a rotary motion transmitting element, such as a friction clutch plate, vibration dampener, and the like, comprising a hub member having a flange, and a plate member having portions overlying opposite sides of the flange and oscillatable relative thereto, spring means yieldably cushioning relative rotary movement between said members, said flange having a transverse bore provided therein, a pair of shoes slidably received in said bore with a working fit and slidably engaging said plate portions frictionally to resist relative rotary movement between said members in both directions, and compressible resilient means compressed between said shoes pressing the latter into tight frictional engagement with said plate portions.

2. In a rotary motion transmitting element, such as a friction clutch plate, vibration dampener, and the like, comprising a hub member having a flange, and a plate member having portions overlying opposite sides of the flange and oscillatable relative thereto, the plate and flange having a series of circumferentially spaced rectangularly shaped registering coiled spring receiving portions, coiled springs in said portions compressible between said hub and plate members to cushion relative rotary movement therebetween, said flange having a series of parallel bores provided therein transversely thereof, all at the same radius with reference to the axis of rotation and in circumferentially spaced relation to said springs, a pair of shoes slidably received in each of said bores with a working fit and slidably engaging said plate portions frictionally to resist relative rotary movement between said members in both directions, and compressible resilient means compressed between said shoes pressing the latter into tight frictional engagement with said plate portions.

3. In a rotary motion transmitting element, such as a friction clutch plate, vibration dampener, and the like, comprising a hub member having a flange, and a plate member having portions overlying opposite sides of the flange and oscillatable relative thereto, spring means yieldably cushioning relative rotary movement between said members, said flange having a transverse bore provided therein, a pair of shoes slidably received in said bore with a working fit and slidably engaging said plate portions frictionally to resist relative rotary movement between said members in both directions, and a leaf spring disposed between said shoes generally in the plane of said flange and bowed by engagement on its opposite sides with projections provided on the shoes, whereby to exert spring pressure outwardly on both shoes to an equal extent.

4. In a rotary motion transmitting element, such as a friction clutch plate, vibration dampener, and the like, comprising a hub member having a flange, and a plate member having portions overlying opposite sides of the flange and oscillatable relative thereto, the plate and flange having a series of circumferentially spaced rectangularly shaped registering coiled spring receiving portions, coiled springs in said portions compressible between said hub and plate members to cushion relative rotary movement therebetween, said flange having a series of parallel bores provided therein transversely thereof, all at the same radius with reference to the axis of rotation and in circumferentially spaced relation to said springs, a pair of shoes slidably received in each of said bores with a working fit and slidably engaging said plate portions frictionally to resist relative rotary movement between said members in both directions, and a leaf spring in each of said bores disposed between the shoes therein generally in the plane of said flange and bowed by engagement on its opposite sides with projections provided on the shoes, whereby to exert spring pressure outwardly on both shoes to an equal extent.

5. In a rotary motion transmitting element, such as a friction clutch plate, vibration dampener, and the like, comprising a hub member having a flange, and a plate member having portions overlying opposite sides of the flange and oscillatable relative thereto, spring means yieldably cushioning relative rotary movement between said members, said flange having a triangular-shaped bore provided therein transversely thereof with the apex of the triangle radially innermost and the base of the triangle radially outermost with reference to the axis of rotation, a pair of shoes of triangular shaped cross-section slidably received in said bore with a working fit and having flat surfaces slidably engaging said plate portions frictionally to resist relative rotary movement between said members in both directions, and compressible resilient means compressed between said shoes pressing the latter into tight frictional engagement with said plate portions.

6. In a rotary motion transmitting element, such as a friction clutch plate, vibration dampener, and the like, comprising a hub member having a flange, and a plate member having portions overlying opposite sides of the flange and oscillatable relative thereto, the plate and flange having a series of circumferentially spaced rectangularly shaped registering coiled spring receiving portions, coiled springs in said portions compressible between said hub and plate members to cushion relative rotary movement therebetween, said flange having a series of parallel bores provided therein transversely thereof, all at the same radius with reference to the axis of rotation and in circumferentially spaced relation to said springs, said bores being of triangular shape and all at the same radius with reference to the axis of rotation, the apex of the triangle being in each case radially innermost and the base of the triangle radially outermost with reference to the axis of rotation, a pair of shoes in each bore of triangular shaped cross-section slidably received in said bore with a working fit and having flat surfaces slidably engaging said plate portions frictionally to resist relative rotary movement between said members in both directions, and compressible resilient means compressed between said shoes pressing the latter into tight frictional engagement with said plate portions.

7. In a rotary motion transmitting element, such as a friction clutch plate, vibration dampener, and the like, comprising a hub member having a flange, and a plate member having portions overlying opposite sides of the flange and oscillatable relative thereto, spring means yieldably cushioning relative rotary movement between said members, said flange having a triangular-shaped bore provided therein transversely thereof with the apex of the triangle radially innermost and the base of the triangle radially outermost with reference to the axis of rotation, a pair of shoes of triangular shaped cross-section slidably received in said bore with a working fit and having flat surfaces slidably engaging said plate portions frictionally to resist relative rotary movement between said members in both directions, and a generally triangularly shaped leaf spring disposed between said shoes generally in the plane of the flange fitting loosely but nonrotatably in the bore and bowed in one direction at the three corners thereof by projections provided on the one shoe and bowed in the opposite direction substantially at the center by a projection provided on the other shoe.

8. In a rotary motion transmitting element, such as a friction clutch plate, vibration dampener, and the like, comprising a hub member having a flange, and a plate member having portions overlying opposite sides of the flange and oscillatable relative thereto, the plate and flange having a series of circumferentially spaced rectangularly shaped registering coiled spring receiving portions, coiled springs in said portions compressible between said hub and plate members to cushion relative rotary movement therebetween, said flange having a series of parallel bores provided therein transversely thereof, all at the same radius with reference to the axis of rotation and in circumferentially spaced relation to said springs, said bores being of triangular shape and all at the same radius with reference to the axis of rotation, the apex of the triangle being in each case radially innermost and the base of the triangle radially outermost with reference to the axis of rotation, a pair of shoes in each bore of triangular shaped cross-section slidably received in said bore with a working fit and having flat surfaces slidably engaging said plate portions frictionally to resist relative rotary movement between said members in both directions, and a leaf spring in each of said bores of generally triangular shape fitting loosely but nonrotatably in the bore disposed between the shoes therein generally in the plane of the flange and bowed in one direction at the three corners thereof by projections provided on the one shoe and bowed in the opposite direction substantially at the center by a projection provided on the other shoe.

9. In a rotary motion transmitting element, such as a friction clutch plate, vibration dampener, and the like, comprising a hub member having a flange, and a plate member having portions overlying opposite sides of the flange and oscillatable relative thereto, spring means yieldably cushioning relative rotary movement between said members, said flange having a transverse bore provided therein, a pair of shoes slidably received in said bore with a working fit and slidably engaging said plate portions frictionally to resist relative rotary movement between said members in both directions, and compressible resilient means compressed between said shoes pressing the latter into tight frictional engagement with said plate portions, said brake shoe being made of friction clutch facing material.

10. In a rotary motion transmitting element, such as a friction clutch plate, vibration dampener, and the like, comprising a hub member having a flange, and a plate member having portions overlying opposite sides of the flange and oscillatable relative thereto, the plate and flange having a series of circumferentially spaced rectangularly shaped registering coiled spring receiving portions, coiled springs in said portions compressible between said hub and plate members to cushion relative rotary movement therebetween, said flange having a series of parallel bores provided therein transversely thereof, all at the same radius with reference to the axis of rotation and in circumferentially spaced relation to said springs, a pair of shoes slidably received in each of said bores with a working fit and slidably engaging said plate portions frictionally to resist relative rotary movement between said members in both directions, and compressible resilient means compressed between said shoes pressing the latter into tight frictional engagement with said plate portions, each of said brake shoes being made of friction clutch facing material.

References Cited in the file of this patent

UNITED STATES PATENTS

| | | |
|---|---|---|
| 1,734,101 | Wemp | Nov. 5, 1929 |
| 1,749,554 | Wichert | Mar. 4, 1930 |
| 2,143,040 | Thelander | Jan. 10, 1939 |
| 2,613,785 | Mohns | Oct. 14, 1952 |